United States Patent

[11] 3,585,868

[72] Inventor Robert T. Scott
 Boonton, N.J.
[21] Appl. No. 823,126
[22] Filed May 8, 1969
[45] Patented June 22, 1971
[73] Assignee International Controls Corporation
 Fairfield, N.J.

[54] LINEAR MOTION INTO ROTARY MOTION
 8 Claims, 6 Drawing Figs.
[52] U.S. Cl.................................................. 74/89.15,
 74/459
[51] Int. Cl.................................................F16h 27/02,
 F16h 55/04
[50] Field of Search........................................... 74/89.15,
 459, 216.3; 60/23

[56] References Cited
 UNITED STATES PATENTS
2,926,537 3/1960 Pieterse........................ 74/216.3
2,912,662 11/1959 Faymoreau.................... 74/216.3
2,946,235 7/1960 Musser.......................... 74/459

2,959,978 11/1960 Boutinell...................... 74/459
3,009,723 11/1961 Patrignani.................... 74/216.3
 FOREIGN PATENTS
 212,164 11/1960 Austria......................... 74/89.15

Primary Examiner—Fred C. Mattern, Jr.
Assistant Examiner—Wesley S. Ratliff, Jr.
Attorney—Nolte and Nolte ABSTRACT: Devices are provided for translating linear motion into rotary motion. The devices are particularly suited for use with mechanisms known as thermal motors or thermal actuators. These devices include a rotatable member, means associated with the rotatable member and adapted to be acted upon to impart a moment of rotation to the rotatable member, and means communicating between linearly driven means the motion of which is to be translated into rotary motion and means associated with the rotatable member to transmit work arising from the linear driving of the former to the latter to rotate the rotatable member. When one of these devices is utilized in combination with a thermal motor, the linearly driven member is part of the thermal motor.

PATENTED JUN22 1971 3,585,868

INVENTOR
ROBERT T. SCOTT
BY
Nolte & Nolte
ATTORNEYS

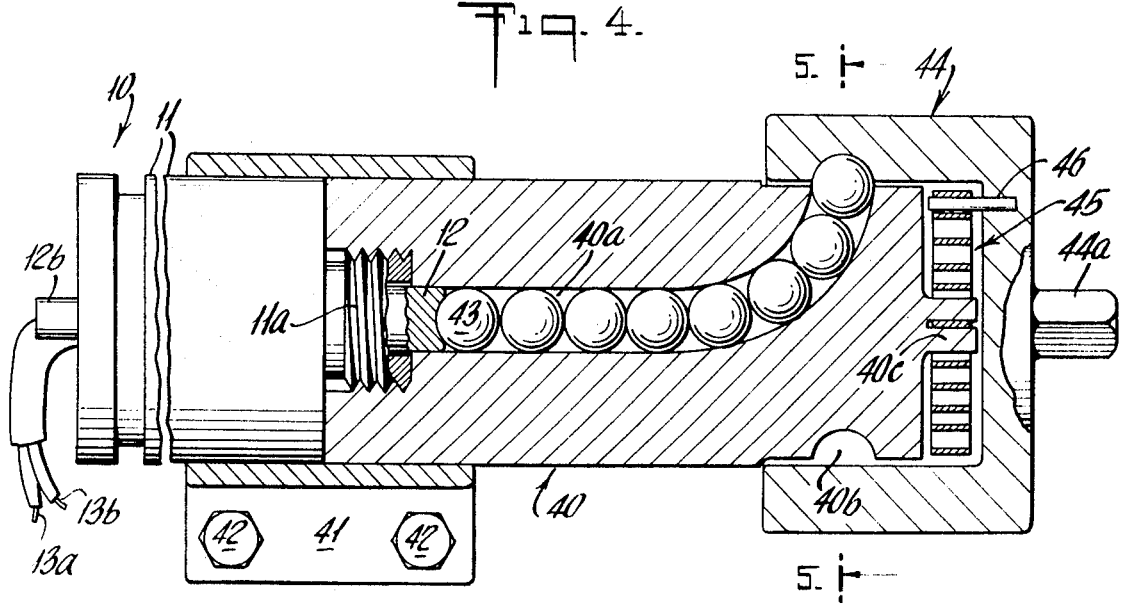
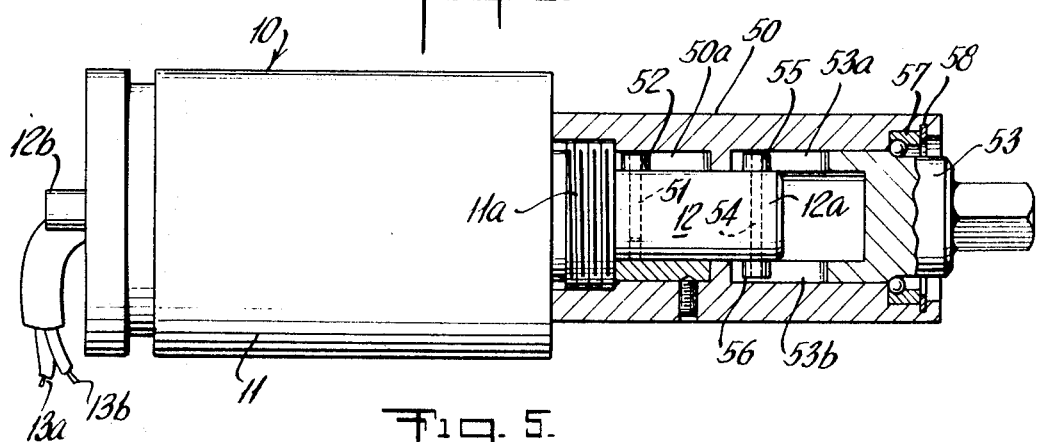
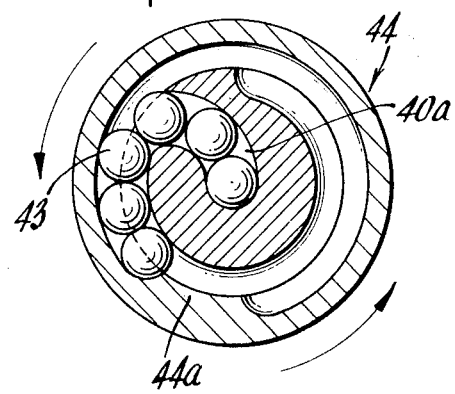

LINEAR MOTION INTO ROTARY MOTION

This invention relates to devices for translating linear motion into rotary motion. More particularly, the invention relates to such devices which are particularly adapted for use in combination with thermal motors or actuators.

A thermal motor or actuator has an output shaft which is axially driven. Particular constructions of thermal motors are described in commonly assigned pending application Ser. No. 702,920, filed Feb. 5, 1968. The present invention is applicable, however, to thermal motors in general, whatever their construction.

Since the motion of the output shaft of a thermal motor is linear, if it is desired that the thermal motor be employed for rotational driving or actuation it is necessary to provide means for translating the linear output of the thermal motor into rotary motion.

The present invention provides devices to meet this need, which devices are, moreover, generally applicable wherever it is desired to translate linear motion into rotary motion. The devices of the invention comprise a rotatable member, means associated with the rotatable member and adapted to be acted upon to impart a moment of rotation to the rotatable member, and means communicating between linearly driven means the motion of which is to be translated into rotary motion and the means connected to the rotatable member to transmit work arising from the linear driving of the former to the latter to rotate the rotatable member. The aforementioned means associated with the rotatable member may be integral with or operatively, though not necessarily physically, connected to the rotatable member.

The hereinabove referred to thermal motors are essentially cylinder and piston arrangements, with an expansible material in the cylinder driving the piston and the piston being elongated to provide the output shaft of the thermal motor. When the cylinder is axially fixedly mounted, the shaft is linearly driven by the expansible material. On the other hand, when the shaft is axially fixedly mounted, the expansible material will linearly drive the cylinder. Devices according to the invention can be employed to translate the resultant linear motion of either the shaft or the cylinder of a thermal motor into rotary motion.

The invention will now be further described by reference to particular embodiments thereof which are illustrated in the drawings, in which:

FIG. 4 is a plan view, partly in section, of a thermal motor in combination with a third embodiment of a translating device according to the invention and FIG. 5 is a section along line I-I of FIG. 4 with the device of FIG. 4 being in a moved position;

Figure 1:
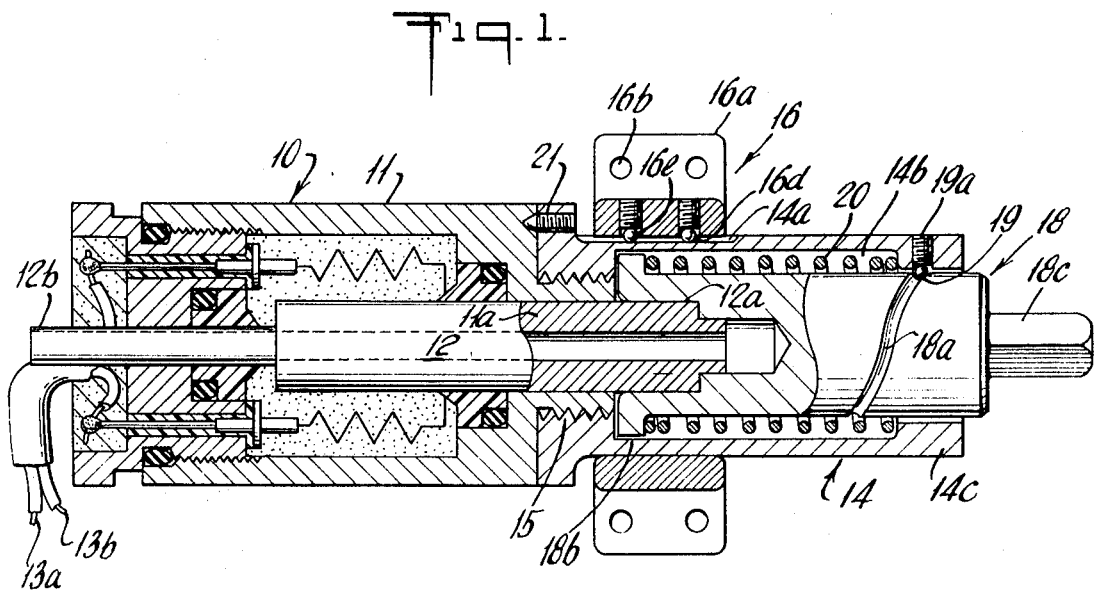
FIG. 1 is a plan view, partly in section, of a thermal motor in combination with a first embodiment of a translating device according to the invention.
Figure 2:
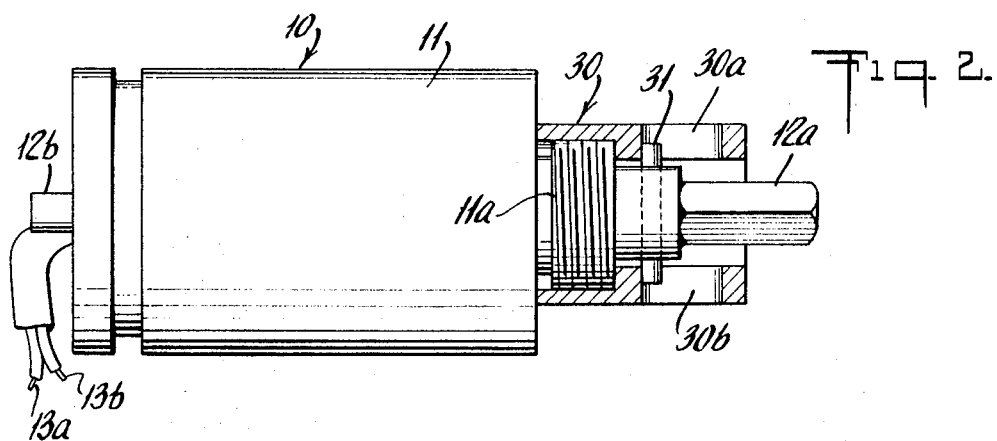
FIG. 2 is a plan view, partly in section, of a thermal motor in combination with a second embodiment of a translating device according to the invention.

FIG. 6 is a plan view, partly in section, of a thermal motor in combination with a fourth embodiment of a translating device according to the invention; and In each of the embodiments, the thermal motor may be as shown and described in detail in the above referred to copending application. Since a detailed description of the thermal motor may be found in that application and moreover, the details of internal construction of the thermal motor are not of consequence in the present invention, the thermal motor will be described herein only in general terms. The thermal motor 10 has a cylinder portion 11 and a piston portion 12 which is elongated to constitute at one of its ends an output shaft 12a and elongated and stepped down to constitute at the other of its ends an output shaft 12b. The output shaft portion of the piston 12 employed herein is 12a but the other piston extension 12b, could equally well be employed. Electrical conductors 13a and 13b transmit power to heating means (not shown) for heating the thermally expansible material in the cylinder 11. In the embodiments of FIGS. 1 and 2, the output shaft 12a of the thermal motor 10 is axially fixed whereby the cylinder 11 is linearly driven by the expansion of the thermally expansible material. On the other hand, in the embodiments of FIGS. 4 and 6, the cylinder 11 is axially fixed whereby the output shaft 12a is linearly driven by the expansion of the thermally expansible material.

Referring now in more detail to the embodiment of FIG. 1, a housing 14 having internal threads 15 at one end is mounted by means of the threads 15 on an externally threaded neck portion 11a of the cylinder 11. A set screw or other locking means 21 prevents rotation of the housing 14 relative to the cylinder 11. A sleeve 16 extends about the housing 14. Feet 16a having holes 16b, are provided on the sleeve 16 for mounting the sleeve to a stationary base (not shown) by the use of screws or other attaching means (not shown). Balls 17 are positioned in the interior of the sleeve 16, in sockets 16d, 16e. An axial groove 14a is provided along part of the length of the exterior of the housing 14. The balls 17 are engaged in the slot 14a whereby the assembly constituted of the thermal actuator cylinder 11 and the translating device sleeve 16 is free to move axially but is restrained against rotation.

Fixedly mounted on the output shaft 12a of the thermal motor 10 is a shaft 18 provided on its circumference with a helical groove 18a. One of the ends of the shaft 18 defines an annular flange 18b and the other of its ends defines a drive shaft 18c which may be of square cross section or splined or of any other configuration conventional for drive shafts. The drive shaft 18c is connected to and rotationally drives the rotationally driven device (not shown). The device which the drive shaft 18c is driving is axially fixed relative to the axis of the shaft 18 whereby the shaft 18 and, hence, the shaft 12a cannot move axially. At the interior of the free end of the housing 14 is positioned a ball 19 in socket 19a which engages the groove 18a of shaft 18. The interior of the housing 14 is provided with an annular recess 14b in which is mounted a helical spring 20, one end of the helical spring 20 engaging the outwardly extending flange 18b of the shaft 18 and the other end of the helical spring 20 engaging an inwardly extending flange 14c located at the free end of the housing 14.

In operation, the cylinder 11 is driven by the thermal motor and thereby drives with it the housing 14, to the right. The ball 19 is thereby urged against a sidewall of the groove 18a whereby the shaft 18 is rotated. When the cylinder 11 is no longer urged to the right, spring 20, which has been compressed by the rightward travel of the cylinder 11 with housing 14, is allowed to expand and thereby move the cylinder 10-housing 14 assembly to the left back to its original position shown in FIG. 1.

Figure 3:
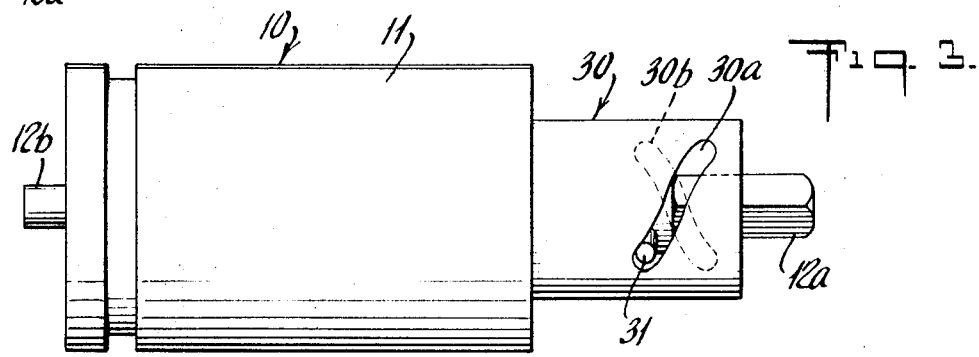
FIG. 3 is an elevational view of the slotted member of FIG. 2

With respect to the embodiment of FIGS. 2 and 3 a sleeve 30 is mounted on the neck 11a in the same manner as in the embodiment of FIG. 1 the sleeve 14 is mounted. Again, a set screw or other locking means (not shown) is provided to prevent rotation of the sleeve relative to the cylinder. The output shaft 12a is shown to be of a somewhat more elongated configuration, though this is a minor design detail. A roller pin 31 is mounted through the shaft 12 for rotation about an axis perpendicular to the axis of the shaft 12. The housing 30 is provided with two helical slots 30a and 30b which opposed ends of the pin 31 engage. As in the embodiment of FIG. 1, the drive shaft 12a is fixed by virtue of connection to the device (not shown) which it is rotationally driving.

Thus, in operation, expansion of the material in the cylinder 11 by heating thereof drives the cylinder 11, and with it the housing 30 to the left whereby sidewalls of the slots 30a and 30b are urged against the opposed ends of the pin 31 which roll along said walls whereby the shaft 12 is rotated. A return spring may be provided by an arrangement such as shown in FIG. 1. Also, if desired, a sleeve arrangement as in FIG. 1 may be provided. In this respect, it should be noted that the sleeve arrangement in FIG. 1 is entirely optional, and if adequate support is found to exist without such an arrangement, the sleeve arrangement may be eliminated.

Referring now in more detail to the embodiment of FIGS. 4 and 5, a shaft 40 is mounted on the neck 11a of the cylinder 11 in the same manner that the housings are mounted in the embodiments of FIGS. 1 and 2. A bracket 41 provided with bolts 42 is employed to fixedly mount the assembly constituted of the cylinder 11 and the shaft 40. Defined in the shaft 40 is a cylindrical passage 40a in the form of an axial bore curving into a radial race, the latter communicating with an annular passage of circular cross section 40b half defined by an annular groove of semicircular cross section on the surface of the shaft 40 and half defined by an annular groove of semicircular cross section on an internal wall of a rotary member 44 rotationally mounted on the shaft 40. The rotary member 44 is provided with an output shaft 44a of noncircular cross section, the output shaft 44a being connected to the device which is to be rotationally driven (not shown). Inside the rotary member 44 is mounted a torsion spring 45, the inside end of spring 45 being fixed to a projection 40c of the shaft 40 and the outside end of the spring 45 being fixed to a pin 46. The pin 46 is fixedly mounted in the rotary member 44.

In operation, the thermal motor drives the shaft 12 to the right, pushing some of the balls 43 into the passage 40b (FIG. 3a). The interior of the annular wall of the rotary member 44 is provided with an abutment 44a against which the forwardmost of the balls 43 is urged, thus rotating the rotary member 44. This rotation winds the torsion spring 45. When the shaft is no longer so driven, the shaft 12 no longer thrusts to the right, whereby the torsion spring 45 is permitted to unwind, pushing the balls back down into the passage 40a and thus pushing the shaft 12 back to its original position as shown in FIG. 4.

With respect to the embodiment of FIG. 6, a housing 50 is mounted on the neck 11a of the cylinder 11 in the same manner as the housing in the embodiments of FIGS. 1 and 2 and the shaft 40 in the embodiment of FIG. 4 are mounted. In an axially extending segment of the housing 50 is defined a linear slot 50a in sleeve 50b parallel to the axis of the shaft 12. A pin 51 on which is rotatably mounted a roller 52 is mounted in the shaft 12 perpendicular to the axis of the shaft 12. The roller 52 engages the groove 50a whereby the shaft 12 is free to reciprocate but is prevented from rotating. Rotationally mounted in the housing 50 is a rotary member 53 having helical slots 53a and 53b, of the same configuration as shown in FIG. 3, in its walls. A second pin 54 is fixed in the shaft 12 and has an axis perpendicular to the axis of the shaft 12. Mounted on the pin 54 for rotation about its axis are rollers 55 and 56 which engage the slots 53a and 53b, respectively. A ball bearing assembly 57 is held in place by a retaining ring 58 at the open end of the housing 50. The retaining ring 58 by holding the ball bearing assembly 57 in place restrains the rotary member 53 against axial displacement. A bracket such as shown in FIG. 4 may be used to hold the entire assembly in place.

In operation, heating and resultant expansion of the thermally expansible material in the cylinder 11 drives the shaft 12 to the right and engagement of the rollers 55 and 56 in the slots 53a and 53b rotates the rotary member 53. As in the embodiment of FIG. 1, or FIG. 4 a spring may be provided to return the shaft to its original position.

It is thus seen that each of the devices of the invention translate linear motion into rotary motion completely free of linear motion.

What I claim is:

1. A device for translating the motion of a linearly driven member into rotary motion comprising an axially fixed shaft, a helical groove formed on the surface of said shaft, a ball positioned in said groove, means for retaining said ball in said groove, means for connecting said retaining means to said linearly driven member to be driven linearly thereby and permitting said ball to roll in said groove but holding said ball in a fixed position as said retaining means is driven, whereby said retaining means when connected to said driven member is driven by said driven member urging said ball against said wall of said groove thereby imparting a movement of rotation to said shaft and resilient means for applying a reverse motion to said retaining member to this effect the return thereof to its starting position.

2. A device as defined in claim 1 in combination with a thermal motor having a linearly driven member, said linearly driven member of said thermal motor being connected to said retaining means.

3. A device for translating the motion of a member which is linearly driven on a coaxial axially fixed shaft into rotary motion comprising roller means adapted to be mounted on said shaft for rotation about an axis transverse to the line of motion of the driven member, housing means connected to said linearly driven member and defining a helical groove about and radially spaced from at least a segment of said shaft, said housing means being arranged for being axially driven by said driven member, said roller means being engaged in said helical groove whereby said housing means as it is driven by said driven member urges a sidewall of said groove against said roller means thereby imparting a moment of rotation to said shaft and resilient means for applying a reverse motion to said housing means to effect the return thereof on its starting position.

4. A device as defined in claim 3 in combination with a thermal motor having a linearly driven member, said roller means being mounted on said driven member of said motor.

5. A device for translating the motion of a linearly driven member into rotary motion, comprising a shaft having an axial bore and a radial race, said bore and said race being in mutual communication and said bore for movement axially therein of said linearly driven member, a plurality of balls positioned in said bore and said race, means rotatably mounted on the shaft and defining with said shaft a passage for said balls, said passage communicating with said race and extending at least partly around the shaft, and an abutment in said passage, whereby movement of said linearly driven member axially in said bore toward said race, drives at least the forwardmost one of said balls into said annular passage and against said abutment to rotate said rotatably mounted means.

6. A device as defined in claim 5 in combination with a thermal motor having a linearly driven member, said driven member of said motor being arranged for movement axially in said bore.

7. A device for translating the motion of a linearly driven member into rotary motion, comprising a housing fixedly mounted about said driven member, an axially extending segment of the housing defining a linear groove parallel to the axis of the driven member, means axially fixedly and rotatably mounted in a second axially extending segment of said housing and defining an output shaft and furthermore defining a helical groove about said axis, and first and second roller means being mounted on said driven member each for rotation about an axis traverse to the first mentioned axis, said first roller means being engaged in said linear slot and said second roller means being engaged in said helical slot, whereby movement of the driven member urges the second roller means against a sidewall of said helical groove thereby to impart a moment of rotation to said output shaft while the engagement of the first roller means in the linear slot prevents rotation of the driven member.

8. A device as defined in claim 7 in combination with a thermal motor having a linearly driven member, said first and said second roller means being mounted on said driven member of said motor.